No. 773,004.

Patented October 25, 1904.

UNITED STATES PATENT OFFICE.

JAMES M. DENNIS, OF RICHMOND, INDIANA, ASSIGNOR OF THREE-EIGHTHS TO HARRY R. DENNIS AND WILLIAM H. ALFORD, OF RICHMOND, INDIANA.

ARTIFICIAL FUEL.

SPECIFICATION forming part of Letters Patent No. 773,004, dated October 25, 1904.

Application filed November 27, 1903. Serial No. 182,894. (No specimens.)

*To all whom it may concern:*

Be it known that I, JAMES M. DENNIS, a citizen of the United States, residing in the city of Richmond, in the county of Wayne, and in the State of Indiana, (whose post-office address is Richmond, Indiana,) have invented new and useful Improvements in Artificial Fuel, of which the following is a full and exact specification, which is sufficiently clear and concise as to enable others skilled in the art to which it appertains to make and use the same.

My present invention contemplates a radical difference in the formation of artificial fuels and in the constituent elements thereof from that heretofore employed, the adaptation of some elements previously employed, the utilization of other elements not previously employed, and the chemically transforming and blending of other elements not having been previously employed, which I have determined by a series of experiments to give the greatest efficiency and to produce the results hereinafter stated.

The object of this invention, broadly speaking, is to provide a new artificial or manufactured fuel which will be comparatively inexpensive to manufacture, which can be produced in almost any locality, and which will give the highest degree of efficiency under all conditions in which a fuel may be employed.

Another object in view is to provide a fuel which will be comparatively cheap in price, in which soil or loam enters as the predominating element in its manufacture, which combined with certain chemical ingredients may be manufactured into a combustible product for use as a fuel.

Another object is to provide an artificially-prepared fuel which will be superior to any known natural fuel in that it will burn with a greater heat, will be absolutely smokeless, will produce no clinkers, and will leave only a minimum of residue in combustion, which residue will be a fine ash easily disposed of.

Another object is to provide a new fuel at a minimum of cost and which will produce more heat units than any other known fuel, to provide a fuel requiring less storage capacity according to its inherent heat units, and a consequent less expense and labor in its transportation and attention than that required for other fuels.

Another important object is to provide a fuel which will not in any particular injure iron, steel, or other metals with which it or its heat or gases may come in contact.

Still another object is to provide a composite of tested ingredients forming a smokeless fuel, to coördinate the several elements in a manner that each will contribute its individual quality in order that the coherent total of all their efforts will eventuate in a new and valuable article of manufacture, and, finally, another object is to produce a substantially pure carbonaceous fuel which will evolve no volatile matter until combustion has been effected and which can be prepared and stored for an indefinite period of time without deteriorating.

Other objects and specific advantages of my invention will appear from the following specification and from the claims hereunto appended.

In the carrying out of my invention in a practical manner I will say that the proportions of the various ingredient elements cannot be given with absolute exactitude, for the reasons that the fecundity of the various ingredients varies more or less, the conditions and nature of the earth employed varies greatly, and the specific gravity of other of the elements tends to vary the powers and heat units, and more particularly the quality and the final use for which the fuel is intended will necessitate a variation in the elements and the process of their amalgamation to obtain the variant eventualities. However, I will herein endeavor, as near as possible, to state average proportions and conditions and will set forth the invention as comprehensively as I may.

The predominant element I employ is organic humus, such as a soil loam, which I combine with a smaller proportion of virgin earth to provide a fuel-supporting core and to prevent the fuel from fusing together during ignition. The above-named elements should be thoroughly commingled after being moistened to reduce them to the desired workable consistency, and they should be milled or fractionated, and for certain kinds of high-grade fuel they should be forced through a screen to remove certain undesirable particles—such, for instance, as stones. Other elements which I employ in the manufacture of my fuel are "magnesium sulfate," "Glauber salt," "sodium chlorid," "iron sulfate," "manganese, black oxid of," and "saltpeter." All of the above should be fractionated and thoroughly commingled, forming a fine powder.

I prepare another compound to be added to the above, consisting of "rosin" and "unslaked lime," which two should be placed in a vessel together, then by adding sufficient water to slake the lime the heat generated thereby will melt and liquefy the rosin and reduce the acids therein. The lime and rosin thus prepared acts as a binder and also adds to the combustion of the fuel when finally prepared.

Another and final element, which I term "solidified petroleum," is to be added to the above and which consists of the following ingredients in substantially the proportions stated: "crude oil," ten parts; "rosin," two parts; "saltpeter," one-half of one part; "creosote," ten-twelfths of one part, and "lime" sufficient to set the mass, the object of the creosote being to facilitate the setting and the absorption of the lime and also neutralize the acids in the rosin, and thus allowing the mass to thoroughly amalgamate and solidify. The solidified petroleum when heated in the mixture forms a hydrogen gas and carbon. The saltpeter is decomposed to potassium nitrite and oxygen. The magnesium sulfate forms, with the sodium chlorid, a chlorin or chlorin gas. The rosin is used to bind the mixture together and aids in the combustion of the compound. The heat and the gases formed from the sulfate and salts form hydrogen and leave an iron base, as "iron pyrites." The lime absorbs the excess of chlorin and water and aids in the purification of the hydrogen. The diffusion of the gases through the mass forms enough heat units to burn a large proportion of the hydrogen and produces an ash of alkaline reaction which will be practically self-consuming.

The process of preparation is substantially as follows: Having the organic humus and virgin earth in readiness, as previously stated, I add thereto all of the other named elements, including the previously-prepared rosin and lime and the solidified petroleum, and then thoroughly comminute to mix and blend all of said elements, preferably by passing the mass through a "pug-mill" or the like, from which it is taken in a plastic workable state and formed into balls, cubes, prismatic lumps, or briquets of convenient sizes for transportation and use.

I have found by actual tests and practical experiments that the following-stated proportions of parts give the most satisfactory results: organic humus, twelve hundred parts; virgin earth, four hundred and forty-two parts; magnesium sulfate, twenty-five parts; Glauber salt, (soda sulfate,) fifteen parts; sodium chlorid, (common salt,) ten parts; iron sulfate, twenty-five parts; solidified petroleum, (as above stated,) two hundred parts; manganese, black oxid of, twelve parts; saltpeter, (potassium nitrate,) eleven parts; rosin, (in addition to that in the solidified petroleum,) twenty parts; lime, (in addition to that in the solidified petroleum,) forty parts.

In the amalgamating process it will be apparent that differences may be made in the proportions and in the manner of combining the compost, and as a natural sequence the chemical actions may be retarded or accelerated and somewhat changed, it of course being understood that certain chemical changes will occur. For instance, the spissitude of the organic humus and virgin earth will be changed by the infusion of vital air and will become interspersed and impregnated with the segregated elementary particles of each of the ingredients; but the most decisive and important changes of course will develop when heat is applied for the final combustion, producing the actions above referred to.

The product as it comes from the "mill" should be configured as desired and then left to desiccate by a slow process, or in some instances the desiccating process may be hastened artificially until the whole is in the form and condition requisite for the desired kind of fuel.

My product may be made to simulate hard coal, as a prerequisite of which I take the compost in its plastic state and fractionate it to the desired sizes, as above stated, and then subject the parts to hydraulic or other pressure sufficient in which to compress them to the desired degree of density, by which I have determined approximately that $1°$ of heat will be gained for each one hundred pounds pressure applied.

When ignited for combustion in a stove, grate, furnace, or the like in its finally prepared and ripened state, my fuel will produce a fervent heat by the interactions of the several ingredient elements upon each other and by the infusion of vital air therewith, producing in combustion a bright blue flame of great intensity, consuming practically all of its ingredient elements in its protracted combustion, producing no clinkers or the like, being inappreciably smoky, and leaving a residue formed into an ash.

From the above description it will be apparent that I have produced an improved artificial fuel embodying the objects heretofore referred to in this specification.

While I have described and set forth the best means to me known at this time for carrying out my invention in a practical manner, I desire it to be understood that I do not restrict myself to the exact details or the specific proportions stated, but hold that any changes or variations therein as would suggest themselves to the ordinary chemist would clearly fall within the limits and scope of my invention.

Having now fully described my invention and its application, what I claim, and desire to secure by Letters Patent of the United States, is—

1. An artificial fuel composed of organic humus, virgin earth, magnesium sulfate, Glauber salt, sodium chlorid, iron sulfate, solidified petroleum, black oxid of manganese, saltpeter, and lime, combined substantially as set forth.

2. An artificial fuel composed of humus matter, earth, magnesium sulfate, Glauber salt, sodium chlorid, iron sulfate, solidified petroleum, manganese, saltpeter and lime, all substantially as set forth.

3. An artificial fuel composed of earth, magnesium sulfate, Glauber salt, sodium chlorid, iron sulfate, oil, manganese oxid, saltpeter, and lime, substantially as set forth.

4. An artificial fuel composed of humus loam combined with virgin earth, sulfate of magnesium, Glauber salt, chlorid of sodium, sulfate of iron, black oxid of manganese, lime and a solidified petroleum composed of crude oil, rosin, creosote, and lime, all combined substantially as stated.

5. A fuel composed of adhesive earth, humus soil, magnesium sulfate, soda sulfate, sodium chlorid, iron sulfate, black oxid of manganese, potassium nitrate, lime, and solidified oil composed of crude oil, rosin, creosote, and lime, all substantially as described.

6. An artificial fuel composed of earth, sulfate of magnesium, Glauber salt, lime, and a solidified oil composed of crude oil, rosin, creosote, saltpeter and lime, substantially as set forth.

7. An artificial fuel composed of earth, sulfate of magnesium, Glauber salt, lime, and oil solidified by the addition thereto of rosin, creosote, saltpeter, and lime, all substantially as set forth.

8. An artificial fuel having combined therewith approximately two hundred parts of solidified petroleum composed of approximately ten parts of crude oil, two parts of rosin, ten-twelfths of one part of creosote, one-half of one part of saltpeter, and lime sufficient to set the mass, all substantially as described and set forth.

9. An artificial fuel composed of approximately fourteen hundred and forty-two parts of earth, twenty-five parts of magnesium sulfate, fifteen parts of Glauber salt, ten parts of sodium chlorid, twenty-five parts of iron sulfate, two hundred parts of solidified petroleum, twelve parts of black oxid of manganese, eleven parts of saltpeter, twenty parts of rosin, and forty parts of lime, all prepared and formed substantially as described.

10. A fuel composed of approximately twelve hundred parts of humus, four hundred and forty-two parts of virgin earth, twenty-five parts of magnesium sulfate, fifteen parts of soda sulfate, ten parts of common salt, twenty-five parts of iron sulfate, two hundred parts of solidified crude oil, twelve parts of manganese oxid, eleven parts potassium nitrate, twenty parts of rosin, and forty parts of lime, substantially as described.

11. The process of preparing humus matter and virgin earth forming the earth element; fractionating together, magnesium sulfate, soda sulfate, sodium chlorid, sulfate of iron, black oxid of manganese; adding together, unslaked lime and rosin, reducing the rosin to a liquid by slaking the lime; solidifying crude oil, by adding thereto rosin, creosote, saltpeter, and lime, to form a mass; then adding all of the above-named chemicals to the earth element and thoroughly mixing the same; and then forming the compost into a usable form for fuel, all substantially as described.

12. The process herein described of preparing artificial fuel, consisting of incorporating together an adhesive earth, sulfate of magnesium, Glauber salt, chlorid of sodium, sulfate of iron, solidified petroleum, black oxid of manganese, rosin, lime, and saltpeter, amalgamating all in a mill, reducing into parts of usable sizes, and then desiccating the parts.

13. In an artificial fuel consisting of crude oil having added thereto rosin, creosote, and lime to solidify it, a proportion of magnesium, Glauber salt, chlorid of sodium, sulfate of iron, black oxid of manganese, saltpeter, rosin, and lime, in substantially the proportions stated, and the process of amalgamating all of the above with a larger quantity of adhesive soil, molding the residue into convenient sizes, and then subjecting them to pressure, all substantially as set forth.

14. The herein-described process of preparing an artificial fuel, which consists in preparing a quantity of earth into a plastic state, adding thereto magnesium sulfate, soda sulfate, sodium chlorid, iron sulfate, and nitrite potassium, in substantially the proportions stated, preparing a compost of lime and rosin as described and adding it to the above, preparing a substantially solidified mass of oil, rosin, creosote, and lime, and adding it to the above, grinding all in a mill to thoroughly mix and fractionate it, forming the plastic mass into lumps, and then subjecting them to hydraulic pressure, all substantially as described.

15. An artificial fuel containing a mixture of soil or the like, sulfate of magnesium, Glauber salt, chlorid of sodium, sulfate of iron, solidified oil, black oxid of manganese, saltpeter, rosin, and lime, subjecting the mass to a thorough mixing, dividing into convenient shapes and sizes, and applying pressure to solidify the parts, and then allowing them to dry, all substantially as described.

16. The herein-described process of making fuel, which consists in producing a plastic compost of soil and petroleum, adding thereto a certain per cent. of sulfate of magnesium, Glauber salt, sulfate of iron, black oxid of manganese, rosin, and lime, then adding a quantity of saltpeter, thoroughly mixing the mass, next forming into convenient sizes, solidifying the parts by pressure, and finally submitting them to a drying process, all substantially as described.

17. The herein-described process of producing fuel which consists in providing a compost mass of earth, magnesium sulfate, soda sulfate, common salt, iron sulfate, black oxid of manganese, potassium nitrate, rosin, lime, creosote, and oil, all combined as set forth, and then formed into convenient sizes, and finally applying a compressing pressure.

18. The herein-described process of producing fuel, which consists of providing a compost mass of earth, magnesium sulfate, soda sulfate, common salt, iron sulfate, black oxid of manganese, potassium nitrate, rosin, lime, creosote, and oil, combining the elements as set forth, then forming into convenient sizes, and applying pressure to the parts, and finally submitting the parts to a drying process.

19. The herein-described fuel which consists in a predominating soil element, a carbon element as oil in suspension, an oxygen-bearing element, chlorin-forming elements, a hydrogen-forming element, a purifying agent, and a binder.

20. In a fuel having therein magnesium sulfate, soda sulfate, salt, iron sulfate, rosin, lime, and solidified oil, all combined with and carried by a predominating body element.

21. A new article of manufacture, a fuel composed of a predominating soil element; a carbon-bearing element; an oxygen-bearing element; chlorin-forming elements; a hydrogen-forming element; a purifying element; and a binder.

In testimony whereof I have hereunto signed my name to this specification in the presence of two subscribing witnesses.

JAMES M. DENNIS.

Witnesses:
HARRY R. DENNIS,
ROBERT W. RANDLE.